Patented Mar. 22, 1938

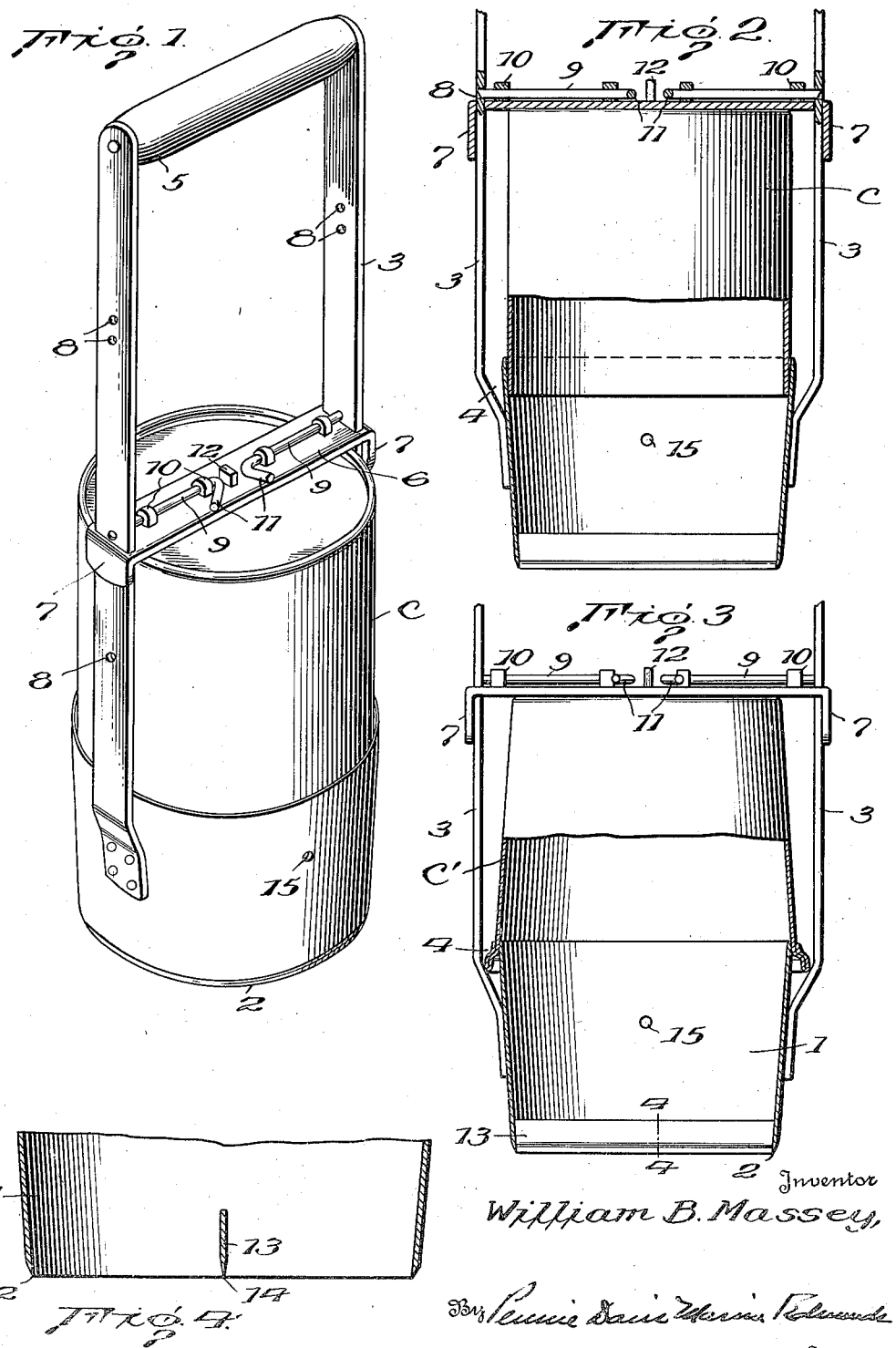

2,112,173

UNITED STATES PATENT OFFICE 2,112,173

DEVICE FOR FILLING CONTAINERS

William Broaddus Massey, Southampton, Va.

Application December 31, 1937, Serial No. 182,899

13 Claims. (Cl. 226—19)

This invention relates to a device for filling containers with a plastic substance, such as ice cream, or the like, and particularly to a device which will cut or remove a portion of such a plastic from a bulk thereof and convey it to a container carried and supported by the device.

An important consideration in the filling of containers with a plastic commodity, such as ice cream, is that it must be done as expeditiously as possible and with a minimum of effort on the part of the operator, while at the same time the amount of the commodity introduced into the container must be such as to completely fill it in order that the customer will be given full measure. A further consideration in the packaging of an edible substance is that any device which is used should be such as to be easily maintained in a clean condition with the cleaning facilities commonly found in ice cream parlors, stores and the like. The use of any device containing crevices, corners, or places from which the material being handled cannot readily be removed by a simple cleaning operation is objectionable because of the resulting contamination of the material by the germs which breed in such places.

Devices for receiving and supporting a container into which ice cream or the like may be forced as the device is pushed into a bulk of the material have been proposed, but as far as I am aware none of them have come into general use. After a careful consideration of devices of the kind previously proposed and extensive experimentation with various types of devices for filling containers with ice cream, it is my opinion that the failure of such devices to come into general use has been due primarily to their failure either to consistently deliver the desired amount by incompletely filling the container, or to their requiring too much effort for salesgirls, who ordinarily are employed for dispensing such material, to operate.

The previous proposals of which I am aware caused a core of ice cream of substantially the same size as the inside of the container to be forced directly into the container from a bulk of the material. Due to the physical characteristics of ice cream, the friction between such a core and the inside wall of the container, together with the resistance afforded by the bulk of material as the device is forced into it, make it necessary to exert a very considerable amount of effort to get the ice cream into the container. Furthermore, as the core of ice cream is of substantially the same size as the inside of the container, it acts as a plunger and tends to compress the air in the closed end of the container without letting it escape, with the result that the bottom of the container frequently will contain air pockets and the customer will not receive full measure.

With the above and other considerations in mind, I have provided a container-supporting device which, as it is pushed into ice cream or other plastic, will cut or remove a portion from the bulk thereof and convey it into a container supported thereby and which will be easy to operate and will consistently give full measure. The device is also adapted for the filling of containers having open ends of various diameters.

More specifically, my device comprises a tubular member having a cutting edge at one end and means for receiving and supporting an open-ended container with the open end directed toward and spaced a substantial distance from the cutting edge, so that when the device is forced into a mass of ice cream a part thereof will be forced through the tubular member into the container. The tubular member thus acts as a cutting and conveying conduit for ice cream to be forced into the container. The tubular member preferably is of frusto-conical shape and tapers so that it diverges from the cutting end towards the other end which supports the container to be filled. The diameter or cross-sectional area of the cutting end is less than the diameter or cross-sectional area of the container to be filled, so that a core cut by that end will not bear against either the inside of the tubular member or the inside of the container as it passes through the tubular member and into the container. Thus, the frictional resistance between the core and the container of former devices is avoided. Also, the core of ice cream, being smaller than the container into which it is being forced, will permit the air in the container, as the core is forced thereinto, to pass around the core and through a vent provided in the tubular conveying member for that purpose.

The invention will be further described in connection with the accompanying drawing, but it is to be understood that such further disclosure is by way of exemplification, and that the invention is not limited thereto except as it may be defined in the appended claims.

In the drawing,

Fig. 1 is a perspective view of my invention with a container held therein.

Fig. 2 is a vertical section showing a container supported within the tubular member;

Fig. 3 is a view similar to Fig. 2, showing a container of larger diameter supported on the outside of the tubular member, and Fig. 4 is a cross-sectional view on line 4—4 of Fig. 3.

Referring to the drawing, a tubular cutting and conveying member 1 of generally frusto-conical shape has a lower cutting edge 2. The lower cutting edge 2 preferably is bevelled to a sharp edge, although if the tubular member is made of sheet metal or a material of comparable thickness the beveling is not necessary as the material itself will be sufficiently thin to provide a cutting edge. The tubular member 1 diverges upwardly and the inside tapering wall forms an abutment for the open end of a container C having a diameter smaller than the diameter of the upper end of the tubular member, as shown in Fig. 2.

The tubular member, with a container held thereto, is adapted to be forced into a plastic medium, such as ice cream or the like, and in order that it may be properly manipulated, it is provided at opposite sides with a pair of substantially parallel handle-supporting members 3, the lower ends of which are riveted, welded or otherwise secured to the tubular member 1 at a substantial distance below the upper edge thereof. Just above the place where the handle-supporting members are secured to the tubular member they are bent outwardly to provide a space 4 between the lower ends and the side wall of the tubular member into which the open end of a container C', Fig. 3, having an open end of larger diameter than the upper end of the tubular member may be inserted, with the lower portion of the handle-supporting members forming an abutment for the open end of such a container. Thus the present device is adapted for the filling of containers having open ends of various diameters.

A handle 5 is supported between the outer or upper ends of the handle-supporting members.

In order to tightly hold a container either against the internal, tapering abutment of the tubular member, or against the inner surface of the tubular member, or against the abutments formed by the lower ends of the handle-supporting members, a locking member 6 is slotted at each end to receive the handle-supporting members 3. The outer ends 7 of the slide member 6 are turned downwardly against the outer sides of the handle-supporting members to maintain the slide member 6 in a position perpendicular to the handle-supporting members as it slides along them. The handle-supporting members are provided with openings 8 spaced opposite one another at intervals along their length to receive the outer ends of latching bolts 9 slidable along the member 6 through guide straps 10. The inner ends of the bolts 9 are turned back at an acute angle so that they may be shoved outwardly to engage in a pair of the openings 8 merely by shoving a thumb or finger between the ends 11. To retract the bolts 9 the ends 11 may be gripped between a finger and thumb and pulled towards one another until they engage a stop 12 provided for that purpose. The openings 8 are arranged at suitable intervals along the handle-supporting members 3 so that the bolts 9 will lie opposite them when the side member 6 is pushed downwardly to engage containers for receiving a quart, pint, or a half pint, of the plastic material. They are also preferably spaced at suitable distances to provide for the filling of containers of more or less standard dimensions.

The manner in which the slide member 6 is held against the bottom of a container to be filled is not important and means other than that just described may, if desired, be provided.

A narrow, vertically-extending cut-off bar 13 having a knife edge 14 lying in the plane of the lower edge of the tubular member 1 is welded or otherwise secured to the internal wall thereof, so that after the tubular member and a container carried thereby has been filled with a plastic medium from a mass thereof, and the device turned slightly either clockwise or counter-clockwise, the plastic in the tubular member and the container will be cut from the bulk of the material.

The tubular member 1 is provided with a pair of diametrically opposite openings 15 which form vents for the escape of air as a plastic material is forced through the tubular member and into a container carried thereby.

As indicated above, the device is adapted for the filling of open-end containers having open ends of a size to be received within the upper or larger end of the tubular member 1, or such containers having open ends large enough to fit over the larger end of the tubular member and to rest against the lower portions of the handle-supporting members 3.

When it is desired to fill a container having an open end of a diameter small enough to be received within the larger end of the tubular member, but large enough to rest upon the tapering wall of the tubular member, it is inserted into the larger end of the tubular member and the locking slide 6 forced against it until it is firmly secured in the position shown in Fig. 2, at which time the bolts 9 are projected outwardly until their outer ends engage in a pair of the openings 8 in the handle-supporting members 3. The device may now be gripped by the handle 5 and the lower end of the tubular member forced into the plastic medium with which the container is to be filled. In filling the container the device is pushed into the plastic medium several times to a depth of about an inch or an inch and a half, and after each operation the device may be turned to enable the cut-off bar to separate the material within the tubular member 1 from the bulk of the material. Also, in forcing the tubular member 1 into the plastic medium the handle preferably is rocked horizontally so that the bulk of the material will not closely engage the outer walls of the tubular member and thereby create frictional resistance to the insertion of the tubular member into the bulk of the material. It is not necessary that the tubular member be forced into the plastic medium at a place where a completely circular core may be cut therefrom, and the device is equally as well adapted to removing a plastic medium from the sides of a container by a series of operations, or it may be used to scrape the plastic medium from the side walls of a container and to force it into the bottom thereof.

After the tubular member and container has been substantially filled in the manner indicated above, the device is withdrawn, the bolts 9 retracted to release the locking member from engagement with the closed end of the container, and the device turned upside down and the handle 5 hit against a solid body. The jar thus caused will result in the container and the plastic material held in the tubular member 1 being dropped from the tubular member, after which the operator may force enough of the plastic material which is now extending above the open end of the container into it to completely fill it, the remainder being put back with the bulk of the material.

When a container having an open end of larger diameter than the larger end of the tubular member 1 is to be filled, the open end thereof is placed around the larger end of the tubular member 1 with the edges of the container resting against the lower ends of the handle-supporting members 3, as shown in Fig. 3. The filling of such a container is carried out in the manner prescribed above in connection with the filling of containers whose open ends are of a diameter small enough to fit within the tubular member.

Regardless of whether the containers to be filled have an open end of larger or smaller diameter than the upper end of the tubular member 1, the core of plastic material forced through the tubular member and into the container will have a smaller diameter than the container or the tubular member, so that there is no friction between the side walls of the core and the tubular member or container which would make it difficult to operate the device. Also, as the core of plastic material is of smaller diameter than the internal diameter of the container, it will not act as a plunger to compress the air into the closed end of the container, but the air will be free to escape along the sides of the core and through the vents 15, thereby avoiding the formation of air pockets in the bottom of the container which would prevent the customer from being furnished full measure.

I claim:

1. A device for filling containers which comprises a tubular cutting and conveying member having a cutting edge at one end thereof, the sides of said member diverging from said end, means for supporting an open-ended container with the open end thereof spaced a substantial distance from said cutting edge, said cutting and conveying member having an air vent between its cutting edge and the open end of a container supported by said supporting means, whereby when said device is forced into a plastic medium a portion thereof will be forced through said tubular member and into a container supported by said device and air in the container will pass alongside said core and be discharged through said vent.

2. A device for filling containers which comprises a tubular cutting and conveying member having a smaller cross-sectional area at one end than at the other, a cutting edge at the end of the tubular member having the smaller cross-sectional area, means for supporting an open-ended container with the open end within the portion of the tubular member of larger cross-sectional area, and at a substantial distance from said cutting edge, whereby when said device is forced into a plastic medium a portion thereof will be forced through said tubular member and into a container supported by said device.

3. A device for filling containers which comprises a tubular cutting and conveying member of generally frusto-conical shape having a cutting edge at the smaller end thereof, a portion of the lateral wall of said member forming a support for the open end of an open-ended container, said cutting and conveying member having an air vent between its cutting edge and the portion of said lateral wall which forms a support for a container, whereby when said device is forced into a plastic medium a portion thereof will be forced through said tubular member and into a container supported by said device and air in the container will pass alongside said portion and be discharged through said vent.

4. A device for filling containers which comprises a tubular cutting and conveying member of generally frusto-conical shape, said member having a cutting edge at the smaller end thereof and abutment means on its outside for the open end of an open-ended container, said abutment means being spaced a substantial distance from said cutting edge, whereby when said device is forced into a plastic medium a portion thereof will be forced through said tubular member and into a container supported on said abutment means, and means for holding the open end of a container against said abutment means.

5. A device for filling containers which comprises a tubular member of generally frusto-conical shape having a cutting edge at the smaller end thereof, means for supporting an open-ended container with the open end adjacent the larger end of said member and a substantial distance from the cutting edge, whereby when said device is forced into a plastic medium a portion thereof will be forced through said tubular member and into a container supported by said device.

6. A device for filling containers which comprises a tubular member of generally frusto-conical shape having a cutting edge at the smaller end thereof, means for supporting an open-ended container with the open end adjacent the larger end of said member and a substantial distance from the cutting edge, whereby when said device is forced into a plastic medium a portion thereof will be forced through said tubular member and into a container supported by said device, and means for permitting the escape of air from such a container as the plastic medium is forced thereinto.

7. A device for filling containers which comprises a tubular member of generally frusto-conical shape having a cutting edge at the smaller end thereof, means for supporting an open-ended container with the open end adjacent the larger end of said member and a substantial distance from the cutting edge, whereby when said device is forced into a plastic medium a portion thereof will be forced through said tubular member and into a container supported by said device, said tubular member having a vent between the cutting edge and the lower edge of such a container for the escape of air from the container as the plastic medium is forced thereinto.

8. A device for filling containers which comprises a tubular cutting and conveying member, a pair of handle-supporting members secured thereto, a handle between said handle-supporting members at their outer ends, said tubular member having a cutting edge at one end thereof, abutment means carried by said tubular member for supporting an open-ended container with the open end spaced a substantial distance from said cutting edge, whereby when said device is forced into a plastic medium a portion thereof will be forced through said tubular member and into a container supported on said abutment means, and means carried by said handle-supporting members and engageable therewith for holding the open end of a container against said abutment means.

9. A device for filling containers which comprises a tubular cutting and conveying member, a pair of handle-supporting members secured thereto, a handle between said handle-supporting members at their outer ends, said tubular member having a cutting edge at one end thereof, abutment means carried by said tubular member for supporting an open-ended container with the open end spaced a substantial distance from said cutting edge, whereby when said device is forced into a plastic medium a portion thereof will be forced through said tubular member and into a container supported on said abutment means, and means slidable along said handle-supporting members and engageable therewith for holding the open end of a container against said abutment means.

10. A device for filling containers which comprises a tubular cutting and conveying member, a pair of handle-supporting members secured thereto, a handle between said handle-supporting members at their outer ends, said tubular member having a cutting edge at one end thereof, abutment means carried by said tubular member for supporting an open-ended container with the open end spaced a substantial distance from said cutting edge, whereby when said device is forced into a plastic medium a portion thereof will be forced through said tubular member and into a container supported on said abutment means, and means slidable along said handle-supporting members and engageable therewith at different places along their length for holding containers of different sizes against said abutment means.

11. A device for filling containers which comprises a tubular cutting and conveying member of generally frusto-conical shape having a cutting edge at the smaller end thereof, means for supporting an open-ended container with the open end thereof spaced a substantial distance from said cutting edge, said cutting and conveying member having an air vent between its cutting edge and the open end of a container supported by said supporting means, whereby when said device is forced into a plastic medium a portion thereof will be forced through said tubular member and into a container supported by said device and air in the container will pass alongside of said portion and be discharged through said vent, and means carried by the end of the tubular member having the cutting edge for separating a plastic medium forced into said tubular member from the bulk of the material.

12. A device for filling containers which comprises a tubular cutting and conveying member, a pair of handle-supporting members secured to the outside of said tubular member adjacent one end thereof, a handle between said handle-supporting members at their outer ends, said tubular member having a cutting edge at its other end, the lower ends of said handle-supporting members having portions forming abutments for supporting an open-ended container with the open end spaced a substantial distance from said cutting edge, whereby when said device is forced into a plastic medium a portion thereof will be forced through said tubular member and into a container supported on said abutments, and means carried by said handle-supporting means for holding a container against said abutments.

13. The combination of a container and filling device therefor comprising a tubular cutting and conveying member of generally frusto-conical shape having a cutting edge at the smaller end thereof, an open-ended container having an open end of larger diameter than the diameter of said tubular member at the end having the cutting edge supported on the tapered inside wall of said frusto-conical tubular member a substantial distance from said cutting edge, means for holding said container against said inner wall, whereby when said device and container are forced into a plastic medium a core thereof of smaller diameter than the inside of the container will be forced through said tubular member and into the container.

WILLIAM BROADDUS MASSEY.

CERTIFICATE OF CORRECTION.

Patent No. 2,112,173. March 22, 1938.

WILLIAM BROADDUS MASSEY.

It is hereby certified that error appears in the printed specification of the above numbered patent requiring correction as follows: Page 2, first column, line 68, for the word "side" read slide; page 4, second column, line 22, claim 12, strike out "means" and insert instead members and engageable therewith; and that the said Letters Patent should be read with these corrections therein that the same may conform to the record of the case in the Patent Office.

Signed and sealed this 3d day of May, A. D. 1938.

(Seal)

Henry Van Arsdale,
Acting Commissioner of Patents.